United States Patent [19]

Delachapelle

[11] Patent Number: 4,470,746
[45] Date of Patent: Sep. 11, 1984

[54] MOBILE AND SWIVELLING TRAILER PLATE, MORE PARTICULARLY FOR TRANSPORTATION OF VARIOUS VEHICLES

[76] Inventor: Marcel J. C. Delachapelle, Rue St-Gilles, Vithers sur Tholon, 89110 Aillant, Yonne, France

[21] Appl. No.: 363,509

[22] Filed: Mar. 30, 1982

[30] Foreign Application Priority Data

Mar. 30, 1981 [FR] France ................................ 81 06298
Aug. 13, 1981 [FR] France ................................ 81 15691

[51] Int. Cl.³ .............................................. B60P 1/24
[52] U.S. Cl. .................................. 414/470; 414/477; 414/478
[58] Field of Search ............... 414/477, 470, 478, 479, 414/480, 494

[56] References Cited

U.S. PATENT DOCUMENTS 2,621,814 12/1952 Lisota ................................... 414/477
2,786,590 3/1957 Edwards et al. ..................... 414/477
3,001,825 9/1961 Rouse .............................. 414/477 X
4,318,658 3/1982 McIntyre ............................ 414/480

FOREIGN PATENT DOCUMENTS 661995 7/1938 Fed. Rep. of Germany ...... 414/480

Primary Examiner—Robert J. Spar
Assistant Examiner—Janice Krizek
Attorney, Agent, or Firm—Becker & Becker, Inc.

[57] ABSTRACT

The trailer includes a frame with two rolling tracks placed on either side of the frame, a rear portion of the frame having at least one bearing in which a pinion can rotate as driven by a reducing mechanism. The pinion cooperates with a rack fixed underneath a mobile plate resting normally on the rolling tracks and adapted for swivelling on the rear of the frame. The mobile plate has a front portion provided with a winch for pulling a vehicle with a cable onto the plate.

18 Claims, 7 Drawing Figures

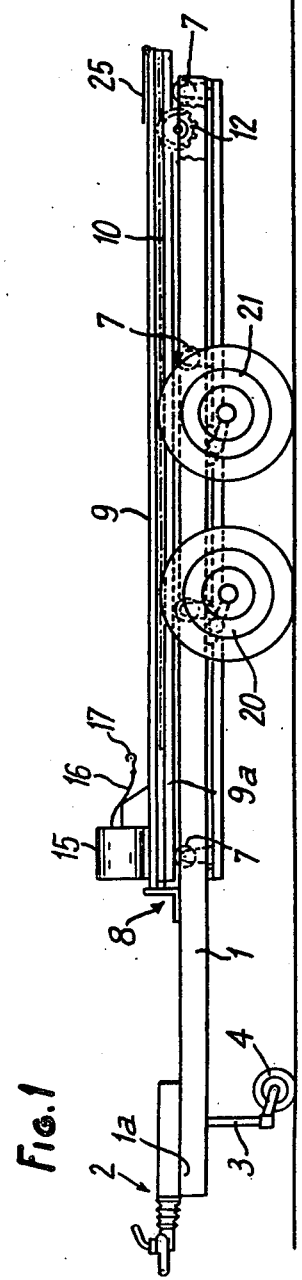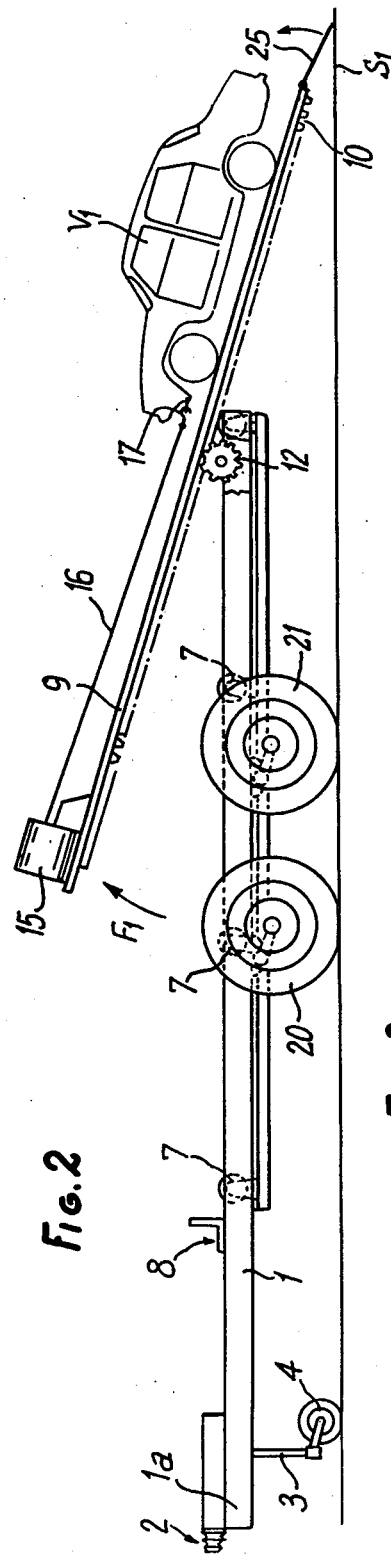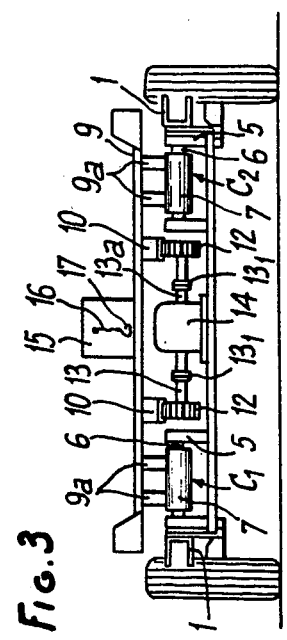

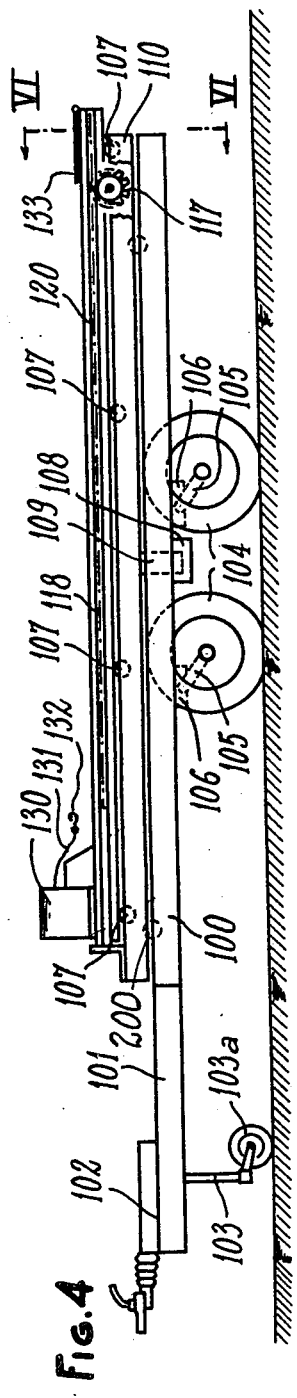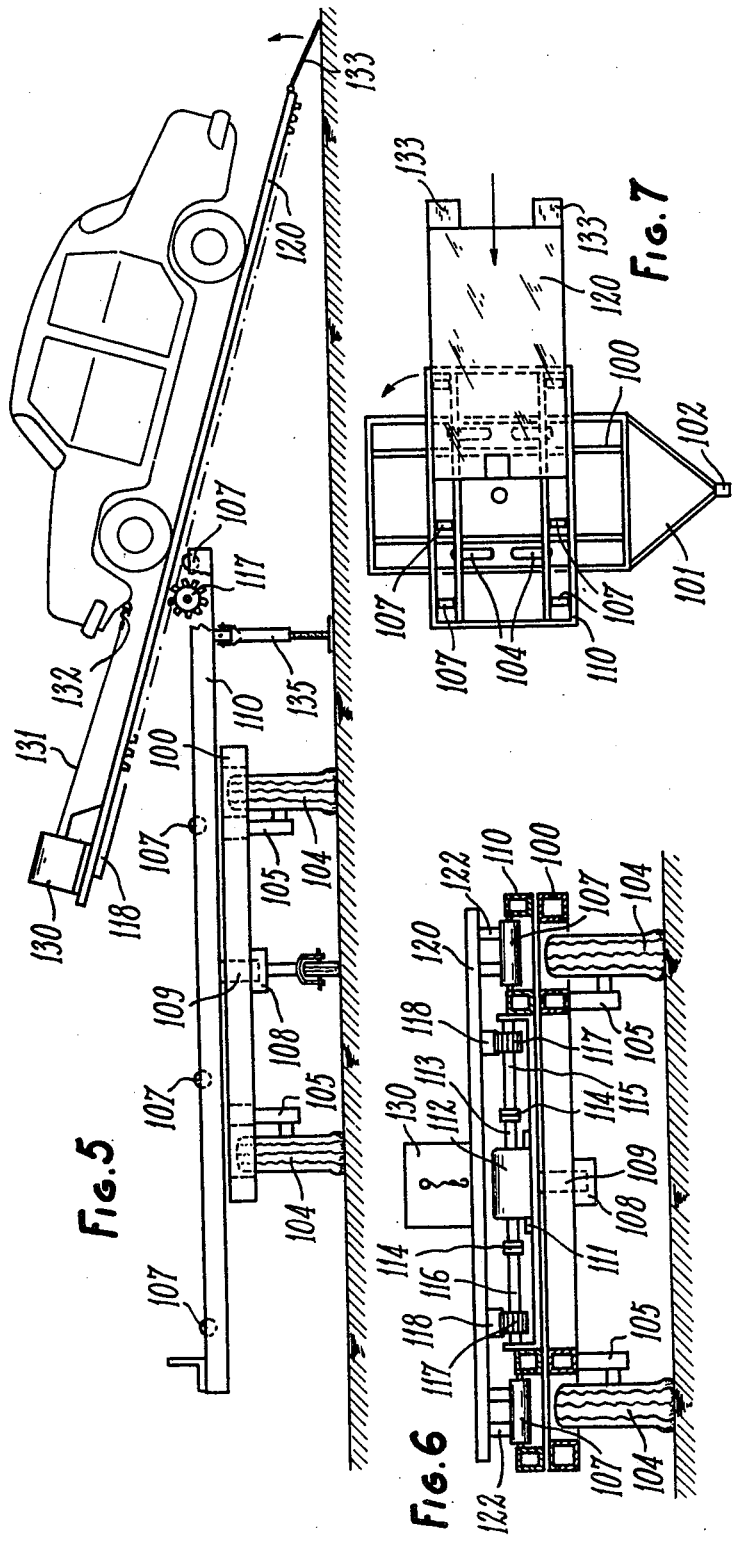

MOBILE AND SWIVELLING TRAILER PLATE, MORE PARTICULARLY FOR TRANSPORTATION OF VARIOUS VEHICLES

BACKGROUND OF THE INVENTION

Trailers provided especially for transportation of vehicles such as private cars, heavy trucks, light trucks, special civilian and military vehicles, are known, but all of these trailers for loading the vehicles require using hydraulic jacks which increase the cost of such trailers; moreover, breakdowns are frequent since the hydraulic circuits are very rapidly damaged, thereby necessitating maintenance and repairs which are often costly and also immobilize the vehicle.

An object of the present invention is to remedy these disadvantages by providing a trailer having a plate which is mobile and swivelling for facilitating the loading and unloading of the vehicles though the driving member thereof is very simple and durable for a long life-time without requiring much maintenance.

SUMMARY OF THE INVENTION

According to the invention, the frame of the trailer includes two rolling tracks placed on either side of the frame and having, in its rear portion, at least, one bearing on which a pinion can rotate as driven by a reducing mechanism; the pinion cooperates with a rack fixed under a mobile plate lying normally on the rolling tracks and adapted for swivelling on the rear of the trailer frame; the mobile plate has a front portion provided with a winch for pulling the vehicles onto the trailer plate by means of a cable.

According to a further feature of the invention, the mobile plate has an underside or underneath portion provided with two racks cooperating with two pinions rigidly connected to the frame of the trailer; the pinions are then arranged on either side of the reducing mechanism.

According to another feature of the invention, the trailer includes a normal frame, mounted on one or several wheel-trains, and which has substantially in its center, a vertical box on which an intermediate frame having a central pin or center shaft can swivel and, if necessary for providing a good swivelling operation of said intermediate frame, idler rollers are placed circularly and resting on a plate mounted on the upper portion of the frame; the intermediate frame supports at least two rolling tracks placed on either side of the frame; at least one bearing is mounted in the rear portion of the frame in which a pinion can swivel as driven by a reducing mechanism; this pinion cooperates with at least one rack fixedly mounted under a mobile plate resting normally on the aforementioned rolling tracks and adapted for swivelling on the rear portion of the intermediate frame placed on the trailer. This plate also carries a winch for pulling a vehicle onto the trailer plate by means of a cable.

According to another feature of the present invention, the underside or underneath portion of the swivelling and mobile plate includes more than one rack cooperating with more than one pinion rigidly connected to the trailer intermediate frame; these pinions are then placed on either side of the reducing mechanism.

This object, and other objects and advantages of the present invention, will appear more clearly from the following specification in connection with the accompanying drawings in which:

BRIEF DESCRIPTION OF THE DRAWINGS

FIG. 1 is a side elevational view of the trailer with a plate being placed on the frame of the trailer in accordance with the present invention;

FIG. 2 is a side elevational view of the trailer showing the plate in a rear inclined position with a vehicle being loaded on the plate;

FIG. 3 is a rear elevational view of the trailer with the plate on the frame;

FIG. 4 is a side elevational view of the trailer in its normal resting position;

FIG. 5 is a rear elevational view of the trailer when loading a vehicle disposed transversely relative to the circulation of a thoroughfare, therefore located transverse to the normal displacement direction of the trailer;

FIG. 6 is a cross-sectional view taken substantially along line VI—VI of FIG. 4; and FIG. 7 is a plan view corresponding to FIG. 5 at a reduced scale.

DESCRIPTION OF THE PREFERRED EMBODIMENT

Referring now to the drawings in detail, FIG. 1 shows a trailer having a frame 1 formed, as in most cases, by beams suitably braced and having a front portion 1a provided with a coupling device 2 of the type conventionally used and therefore, not described in further detail in the following disclosure. A front strut 3 carries a small wheel 4 and is retractable so that the small wheel 4 is spaced from the ground when the trailer is coupled by the coupling device 2 to a tractor truck (not shown). Moreover, the trailer frame 1 is supported in the present case by wheel-trains 20, 21 as apparent in the drawings, though, in some cases, only a single wheel-train can be used.

As best shown in FIGS. 2 and 3, the frame 1 carries two rolling tracks $C_1$, $C_2$ formed by rollers supported by members 5 each carrying a pin 6 on which a roller 7 can rotate freely. The front portion of the frame 1 is provided with a transverse abutment 8 against which a plate 9 normally comes into engagement. The plate 9 bears on the rollers 7 via reinforcements 9a. The plate 9 comprises two racks 10 having teeth which extend downwardly. The racks 10 are fixed underneath the plate 9 by any suitable securing means; the racks 10 cooperate with pinions 12 which are mounted on shafts 13, 13a rotatably driven by a reducing gear 14. Couplings $13_1$ are advantageously provided between each shaft 13, 13a and each pinion 12. The reducing gear 14 can be a manually operated reducing gear or a motor-reduction unit of any known type but comprising two motive output shafts. Moreover, as clearly shown in FIGS. 1 and 2, the front portion of the plate 9 comprises a winch 15 on which a cable 16 is wound. The cable 16 at its free end has a hook 17 provided for cooperating with pulling rings located at the front of a vehicle $V_1$. The winch 15 is driven by a hand-operated reducing gear or a motor reducing unit (not shown) which is placed on the side of the winch. Generally, the motors of the winch 15 of the plate 9 and of the reducing gear 14 of the trailer frame 1 are electrical motors fed or supplied with power or energy from the generating set of the tractor truck for the trailer, but in some cases, these motors can also be supplied from batteries placed on the trailer frame 1.

The operation of the trailer is set forth as follows.

When it is required to transport a vehicle $V_1$ which is on the ground $S_1$ (FIG. 2) the trailer 1 is brought in front of the vehicle; then the plate 9 is moved backwards by means of the reducing gear 14 which rotates the pinion 12 clockwise and thus drives the racks 10 of the plate 9. When the plate 9 has moved backward sufficiently, the plate 9 swivels about the pinion 12 in the direction of arrow $F_1$ of FIG. 2 and a connecting flap 25 is placed in position in order to allow an easy loading of the vehicle $V_1$ which is pulled by the cable 16 of the winch 15. As the vehicle $V_1$ moves upwardly and when the vehicle has reached a certain point (gravity center of plate and vehicle assembly at the vertical of the pinion 12), the plate 9 swivels about the pinions 12 in the direction opposite to that of arrow $F_1$ in FIG. 2. The movement of the vehicle is at a slow speed so that the swivelling of the plate is smooth in order to avoid any rough impact of the plate on the frame; and then the plate 9 resumes its position of origin on the rolling tracks $C_1$, $C_2$ formed by the rollers 7. What is needed then is to rotate the pinions 12 counter clockwise in order to bring the plate forward in direction of the transverse abutment 8 into the position shown in FIG. 1. When the front end of the plate 9 comes into engagement with the transverse abutment 8, plate 9 is then locked on the frame 1 by any convenient means, for example, by spindles extending through the plate 9 and the beams of frame 1. Unloading of vehicle $V_1$ upon arrival at its destination is the reverse of what has been previously described.

It is sometimes possible to use a single rack on pinion arrangement and to provide guides for the plate 9. Instead of the rack or racks 10 and instead of the pinion or pinions 12, it could also be possible to provide one or several endless cables conveniently arranged so as to be wound onto a winch equiped with a motor reducing unit. Such a mounting allows also a backing-up movement of the plate 9 as well as a swivelling in both directions and to bring the plate 9 back to the front, as already described in the foregoing example.

In come cases, it is possible to provide swivelling arms mounted on the frame 1 and carrying an extra frame on which a swivelling and sliding plate is mounted as described previously. Thus, it is possible to place two rows of vehicles in stacked relationship with one on top of the other as is current practice for trailers designed for the transportation of motor vehicles. Furthermore, and although the present trailer is mainly designated for the transportation of various vehicles, such a trailer can also be used for the transportation of loads resting either on wheels or on trains of rollers.

FIG. 4 shows a trailer similar to that of FIG. 1 and having a frame 100 which is formed, as in most cases, by conventiently-braced beams having in their front portion 101 a coupling device 102. This coupling device 102 is of a type currently used and not being described in further detail. The coupling device 102 will include the electrical connections necessary for the side and rear signalization of the trailer, the lighting of its identification plate, the lighting of the license or registration number plate and also possible connections for the brakes of the trailer. A strut 103 is provided near the front end of the trailer and is retractable and foldable when needed, disappearing when the trailer is moved after having been coupled with a tractor truck (not shown) and being generally put in position when the trailer is stopped. A blocking brake can also be provided on wheel 103a of the strut 103. The frame 100 is supported by independent wheels 104 mounted on articulated supports or legs 105, in a conventional manner. These legs 105 are connected to the lower portion or the frame 100 by suspension blocks 106. Most often, the wheels 104 are provided with brakes which are electrically, pneumatically or hydraulically controlled by the tractor truck. In the center portion of the frame 100 there is placed a support box 108 provided for receiving a vertical pin or center shaft 109 rigidly connected to an intermediate frame 110, also formed of beams appropriately braced and, on its upper face, carrying two rolling tracks 107 formed by rollers turning freely on pins rigidly connected to the intermediate frame 110. These rolling tracks are shown in FIG. 7. Moreover, the intermediate frame 110 at its rear portion comprises a box 111 upon which a motor reducing unit 112 is fixed or mounted which, via a throughgoing shaft 113, can drive two couplings 114 transmitting the rotation movement from the motor reducing unit 12 to shafts 115, 116. Pinions 117 are mounted on the shafts 115, 116 for cooperating with racks 118 placed under a plate 120, which is provided for supporting a vehicle to be transported by the trailer. The plate 120 is formed most generally of metallic beams conveniently covered so as to form a very rigid plane surface and which rests, via rails 122, on the rolling tracks 107. Finally, a winch 130 is provided in the front portion of the plate 120, which winch 130, with the assistance of cable 131 and hook 132, enables pulling of the vehicle on the plate 120, so that the vehicle assumes the position as required.

As shown in FIG. 7, the plate 120 has two connecting flaps 133 provided for enabling the wheels of a vehicle to run easily up onto the plate 120.

The operation of the foregoing trailer is set forth as follows.

When an accident has happened and when a damaged vehicle has been moved clear of the public thoroughfare and placed aside, for example in a position more or less transverse to the public thoroughfare, then the tractor truck coupled to the trailer is brought into a position close to the damaged vehicle; the intermediate frame 110 is swivelled about the shaft 109 over a required angle (see FIG. 7) and the plate 120 is then moved in the prolongation of the frame 110. By using a hook 132 fixed onto the end of the cable 131 of the winch 130, the damaged vehicle is then pulled onto the inclined plate 120 as is clearly shown in FIG. 5. In the same manner as explained in referring to FIG. 2, the vehicle is in position, the plate 120 has resumed its horizontal position due to the weight of the damaged vehicle. What is needed, then is to bring the plate 120 back onto the intermediate frame 110 via the pinions 117 and the racks 118 by using the motor reducing unit 112 and the couplings 114. The intermediate frame 110 is then swivelled back and brought parallel to the frame 100; then the frame 100, the intermediate frame 110 and the plate 120 are locked by any appropriate locking or arresting means. The emergency truck is then ready to drive the vehicle to the repair station.

As a matter of course and before loading the vehicle, the strut 103 has been set in position, and then unblocked and folded back before coming back onto the road.

In addition to the pin or vertical shaft 109 resting on the box 108 and as shown in FIG. 4, the top of the frame 100 can also be provided with a plane plate on which idler rollers 200 can roll, which idler rollers 200 are suitably arranged and are rigidly fixed in an operative position thereof underneath the intermediate frame 110.

It is clear from the foregoing that the present invention particularly relates to a trailer coupled to a tractor transportation truck, but the frame of a self-propelled truck can also be equipped with the intermediate frame/plate assembly.

In some cases, the rear part of the intermediate frame 110 can comprise two telescopic and foldable struts 135.

The present invention is, of course, in no way restricted to the specific disclosure of the specification and drawings, but also encompasses any modifications within the scope of the appended claims.

What is claimed is:

1. A mobile and swivelling plate trailer especially for transportation of various vehicles, comprising: a main frame, an intermediate frame, a mobile plate rotatable about a vertical axis with said intermediate frame relative to said main frame and arranged operatively therewith, means including a bearing and a pinion as well as a reducing mechanism also operatively associated with said intermediate frame, two rolling tracks placed on either side of said intermediate frame, a rear portion of the intermediate frame having at least the bearing in which the pinion can rotate as driven by the reducing mechanism, a rack with which said pinion cooperates, said rack being fixed underneath the mobile plate resting normally on said rolling tracks and adapted for swivelling on the rear portion of said intermediate frame as soon as the center of gravity of the mobile plate has passed said rear portion of said intermediate frame, and a winch and cable operatively associated with said mobile plate having a mounting portion provided with said winch for pulling a vehicle with the cable onto said mobile plate, whereby the mobile plate swivels back on said rear portion of the intermediate frame and onto said roller tracks when the center of gravity of the mobile plate and vehicle assembly has passed said rear portion of the intermediate frame.

2. A trailer according to claim 1, wherein the mobile plate has an underneath portion comprising two racks cooperating with two pinions rigidly connected to the intermediate frame of the trailer, said pinions being placed on either side of the reducing mechanism.

3. A trailer according to claim 1, wherein a transverse abutment is provided on the intermediate frame of the trailer in order to limit a stroke of the swivelling and mobile plate.

4. A trailer according to claim 1, wherein both the reducing mechanism and the winch are operated manually.

5. A trailer according to claim 1, wherein both the reducing mechanism and the winch are operated by a motor.

6. A trailer according to claim 5, wherein the reducing mechanism has a double output, the shafts of which are connected via couplings to the pinions which are meshing with the racks.

7. A mobile and swivelling plate trailer, especially for transportation of various vehicles, comprising: a main frame, at least one wheel-train means on which said main frame is mounted, a vertical box provided with said frame substantially centrally thereof, an intermediate frame having a center shaft to permit swivel of the intermediate frame on said vertical box, at least two rolling tracks supported by the intermediate frame and placed on either side thereof, said intermediate frame having a rear portion on which at least one bearing is mounted in which a pinion can rotate as driven by a reducing mechanism therewith, a mobile plate arranged operatively with said main frame, at least one rack fixedly mounted underneath the mobile plate bearing normally on said rolling tracks and adapted for swivelling on a rear portion of the intermediate frame, said plate also carrying a winch for pulling a vehicle via a cable onto the trailer plate whereby the mobile plate swivels back on said rear portion of the intermediate frame and onto said roller tracks when the center of gravity of the mobile plate and vehicle assembly has passed said rear portion of the intermediate frame.

8. A mobile trailer according to claim 7, wherein an underneath portion of the swivelling and mobile plate comprises more than one rack cooperating with more than one pinion rigidly connected to the intermediate frame of the trailer, said pinions being disposed on either side of the reducing mechanism.

9. A mobile trailer according to claim 7, provided to be used with a tractor truck.

10. A mobile trailer according to claim 7, provided to be used with a self propelled truck.

11. A mobile trailer according to claim 7, wherein the main frame has an upper portion provided with a plate mounted thereon, idler rollers being arranged underneath the intermediate frame and resting on said plate.

12. A mobile trailer according to claim 1, provided to be used with a tractor truck.

13. A mobile trailer according to claim 1, provided to be used with a self propelled truck.

14. A trailer according to claim 7, wherein the mobile plate has an underneath portion comprising two racks cooperating with two pinions rigidly connected to the intermediate frame of the trailer, said pinions being placed on either side of the reducing mechanism.

15. A trailer according to claim 7, wherein a transverse abutment is provided on the intermediate frame of the trailer in order to limit a stroke of the swivelling and mobile plate.

16. A trailer according to claim 7, wherein both the reducing mechanism and the winch are operated manually.

17. A trailer according to claim 7, wherein both the reducing mechanism and the winch are operated by a motor.

18. A trailer according to claim 17, wherein the reducing mechanism has a double output, the shafts of which are connected via couplings to the pinions which are meshing with the racks.

* * * * *